United States Patent
Yatomi

(10) Patent No.: US 7,532,803 B2
(45) Date of Patent: May 12, 2009

(54) REPRODUCING APPARATUS

(75) Inventor: Toshiya Yatomi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 11/169,370

(22) Filed: Jun. 29, 2005

(65) Prior Publication Data

US 2006/0001895 A1    Jan. 5, 2006

(30) Foreign Application Priority Data

Jul. 5, 2004    (JP)    ............................. 2004-197613

(51) Int. Cl.
*H04N 5/76* (2006.01)
(52) U.S. Cl. .......................................... 386/68; 386/81
(58) Field of Classification Search .................. 386/46, 386/68, 69, 81
See application file for complete search history.

(56) References Cited

U.S. PATENT DOCUMENTS

| | | | | |
|---|---|---|---|---|
| 5,179,451 A | * | 1/1993 | Takeshita et al. | 386/77 |
| 5,353,404 A | * | 10/1994 | Abe et al. | 345/547 |
| 5,444,580 A | * | 8/1995 | Mitsuda et al. | 360/73.06 |
| 5,754,241 A | * | 5/1998 | Okada et al. | 375/240.05 |
| 5,892,882 A | * | 4/1999 | Kuroda et al. | 386/68 |
| 6,011,663 A | * | 1/2000 | Inoue et al. | 360/48 |
| 6,061,495 A | * | 5/2000 | Yanagihara et al. | 386/68 |
| 6,115,532 A | * | 9/2000 | Saeki | 386/68 |
| 6,233,389 B1 | * | 5/2001 | Barton et al. | 386/46 |
| 6,243,529 B1 | * | 6/2001 | Takayama et al. | 386/68 |
| 6,393,200 B1 | * | 5/2002 | Van Den Enden | 386/68 |
| 6,442,330 B2 | * | 8/2002 | Yanagihara et al. | 386/75 |
| 6,483,985 B1 | * | 11/2002 | Taniguchi et al. | 386/68 |
| 6,587,636 B1 | * | 7/2003 | Tanaka | 386/68 |
| 6,859,612 B2 | * | 2/2005 | Shida et al. | 386/68 |
| 6,985,670 B1 | * | 1/2006 | Saeki | 386/68 |
| 2001/0055469 A1 | | 12/2001 | Shida | |
| 2002/0015577 A1 | * | 2/2002 | Negishi et al. | 386/68 |
| 2003/0037331 A1 | * | 2/2003 | Lee | 725/32 |

FOREIGN PATENT DOCUMENTS

JP    2002-10204 A    1/2002

* cited by examiner

*Primary Examiner*—Thai Tran
*Assistant Examiner*—Gelek Topgyal
(74) *Attorney, Agent, or Firm*—Canon USA Inc. IP Div.

(57) ABSTRACT

A reproducing apparatus includes a reproduction unit transporting a tape-shaped recording medium and reproducing an image data string including coded image data from the recording medium, where the image data is coded by selectively using intraframe coding and interframe predictive coding for every frame, a memory storing the image data string, a decoding unit reading and decoding the image data string stored in the memory, an instruction unit generating an instruction to reproduce in a normal reproduction mode or a slow reproduction mode, and a control unit, responsive to the instruction to start the slow reproduction mode, controlling the reproduction unit to reproduce the image data string while transporting the recording medium at a speed of the normal reproduction mode until a predetermined amount of the image data string is accumulated in the memory, and thereafter, reproducing the image data string while transporting the recording medium at a speed corresponding to the slow reproduction mode.

6 Claims, 5 Drawing Sheets

REPRODUCING APPARATUS

BACKGROUND OF THE INVENTION

1. Field of the Invention

The present invention relates to a reproducing apparatus, and more particularly, it relates to processing of coded image data in slow reproduction.

2. Description of the Related Art

An apparatus, which encodes moving picture data by the MPEG (Moving Picture Experts Group) system and records it on a magnetic tape, is conventionally known (for example, refer to Japanese Patent Application Laid-Open No. 2002-10204: corresponding to U.S. Patent Application Publication No. U.S. 2001/0055469 A1). In Japanese Patent Application Laid-Open No. 2002-10204, a video tape recorder (VTR) having a function for slowly reproducing image data is disclosed, in which the image data is recorded by MPEG-coding. In Japanese Patent Application Laid-Open No. 2002-10204, for example, when image data is slowly reproduced at 1/N times a speed, a tape is transported at a speed 1/N times slower than normal reproduction, and a decoder performs processing at a timing of 1/N as compared with normal reproduction.

In MPEG-coding, coding is performed using intraframe coding (I picture) and interframe predictive coding (P picture, B picture), as well known. Further, according to the MPEG2 system, VBV-Delay information associated with code amount stored in a virtual buffer memory when performing decoding is added into a data stream. When data of each picture in the MPEG stream is decoded, there is a possibility that the data in the memory may suffer underflow, in the case where the data about code amount, which is decided on the basis of the VBV-Delay information, is not accumulated in the memory.

Therefore, when performing reproduction, the decoding of the MPEG data cannot be started until the data necessary for decoding is accumulated in the memory of the reproducing apparatus.

Furthermore, in the VTR disclosed in Japanese Patent Application Laid-Open No. 2002-10204, the tape is transported in slow reproduction at 1/N times a speed. Therefore, it takes much time at the time of starting slow reproduction until the data necessary for decoding is accumulated in the memory as compared with normal reproduction. As a result of this, there is a problem that a waiting time until an image is displayed, becomes longer than in normal reproduction.

SUMMARY OF THE INVENTION

The present invention is directed to a reproducing apparatus.

The reproducing apparatus is capable of quickly displaying an image even when performing slow reproduction.

In one aspect of the present invention, a reproducing apparatus includes a reproduction unit configured to transport a tape-shaped recording medium and reproduce an image data string including coded image data from the tape-shaped recording medium, wherein the coded image data is coded for every frame using intraframe coding and interframe predictive coding selectively, a memory for storing the image data string reproduced by the reproduction unit, a decoding unit configured to read and decode the image data string stored in the memory, an instruction unit configured to generate an instruction to perform reproduction in one of a normal reproduction mode reproducing the image data string at a normal reproduction speed and a slow reproduction mode of reproducing the image data string at a speed slower than the normal reproduction speed, and a control unit configured to, responsive to the instruction from the instruction unit to start the slow reproduction mode, control the reproduction unit to reproduce the image data string while transporting the tape-shaped recording medium at a transport speed of the normal reproduction mode until a predetermined amount of the image data string is accumulated in the memory, and thereafter, to reproduce the image data string while transporting the tape-shaped recording medium at a speed corresponding to the slow reproduction mode.

Other features of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to describe the principles of the invention.

DETAILED DESCRIPTION OF THE EMBODIMENTS

Embodiments of the invention will be described in detail below with reference to the drawings.

Figure 1:
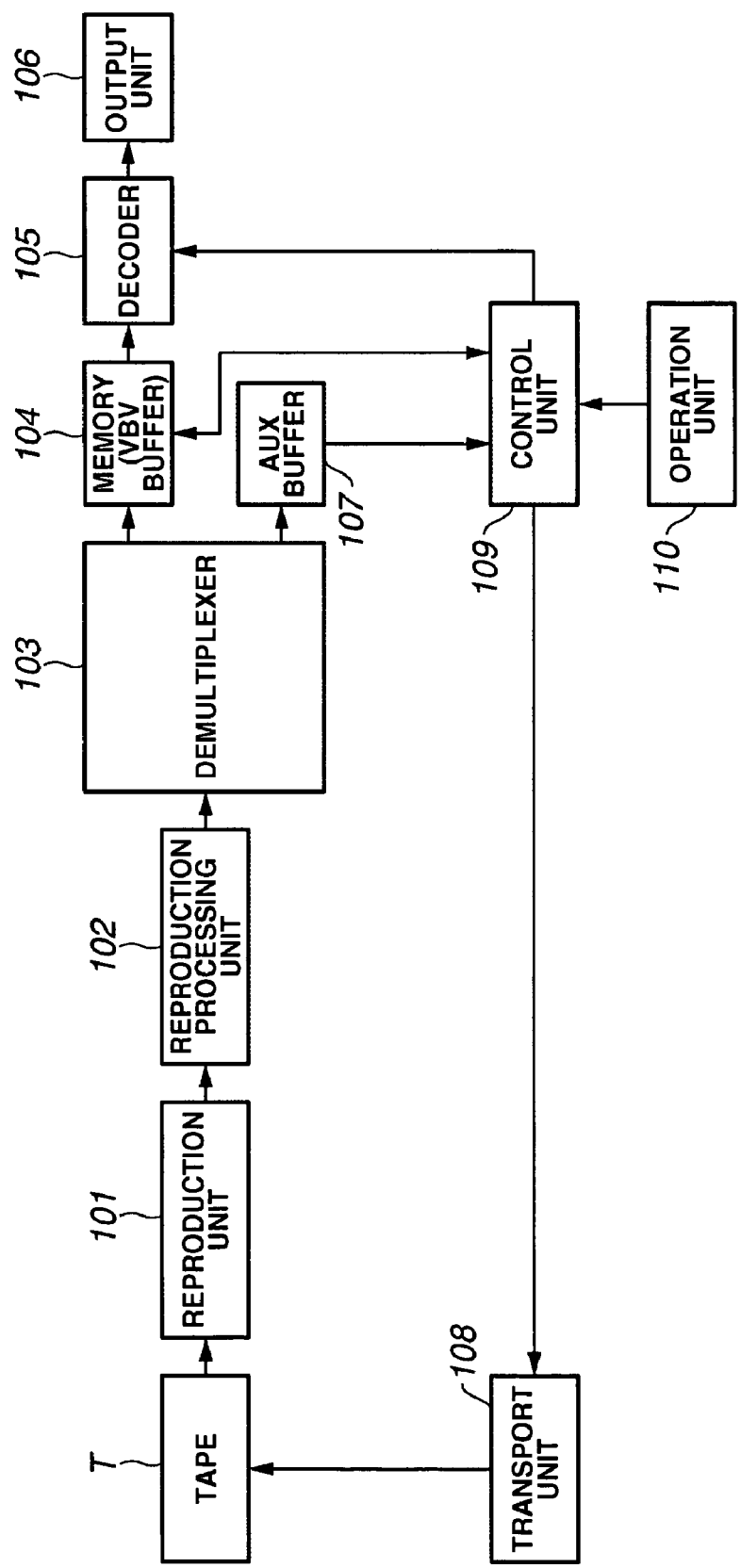
FIG. 1 is a block diagram showing a structure of a reproducing apparatus according to an embodiment of the present invention.

FIG. 1 is a block diagram showing a structure of a reproduction system of VTR according to an embodiment of the present invention.

In VTR of the present embodiment, image data coded by the MPEG 2 system is reproduced from a magnetic tape.

First, a process in normal reproduction is described below.

In reference to FIG. 1, an operation unit 110 includes a power switch, a normal reproduction switch, a slow reproduction switch and a stop switch. Users can give (generate) an instruction to VTR by arbitrarily operating these switches. Further, a control unit 109 controls each unit of VTR according to the instruction from the operation unit 110.

When receiving the instruction of normal reproduction from the operation unit 110, the control unit 109 instructs a transport unit 108 to transport a tape T at a predetermined speed corresponding to a tape transporting speed at the time of recording. The transport unit 108 has various kinds of mechanisms necessary for transporting the tape T, such as a capstan and a capstan motor. The transport unit 108 transports the tape T at a predetermined speed suitable for normal reproduction.

A reproduction unit 101 includes a magnetic head and an amplifier. The reproduction unit 101 reproduces a data string including coded image data from multiple tracks on the tape T, and outputs it to a reproduction processing unit 102. The reproduction processing unit 102 demodulates the reproduced data string, performs error correction, and outputs it to a demultiplexer 103. The demultiplexer 103 detects the MPEG data from the reproduced data string, and outputs it to a memory (buffer memory) 104. Further, the demultiplexer 103 detects auxiliary (AUX) data inputted into a specific position in the reproduced data string, and outputs it to an AUX buffer 107.

According to MPEG2, coding is performed using GOP (Group Of Pictures) as one unit, where GOP has a predetermined number of frames including I picture as one frame. In the MPEG data used in the present embodiment, one GOP includes 15 frames, and P picture is inserted every two B pictures. Further, data of three pictures including one I picture or P picture and two B pictures which follow it is named as one pack unit. The auxiliary information (video AUX data) relating to the data of the pack unit is inputted into every pack unit. The AUX data includes data type information indicating a data type (I picture or P picture) included in the pack unit, and storage time (VBV-Delay) information of VBV (video buffering verifier) buffer required at the time of decoding.

Further, the MPEG data includes audio data, but the audio data corresponding to the image data of three pictures is also stored within one pack unit.

Figure 2:
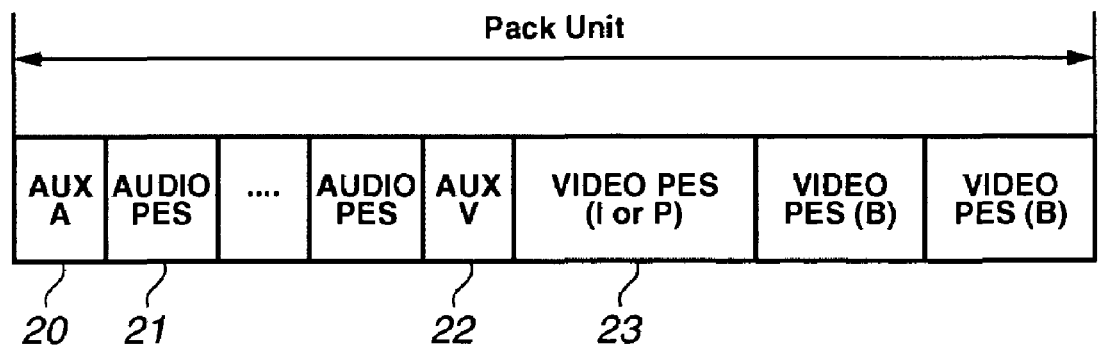
FIG. 2 is a diagram showing a data structure of one pack unit.

FIG. 2 shows a structure of one pack unit.

Figure 3:
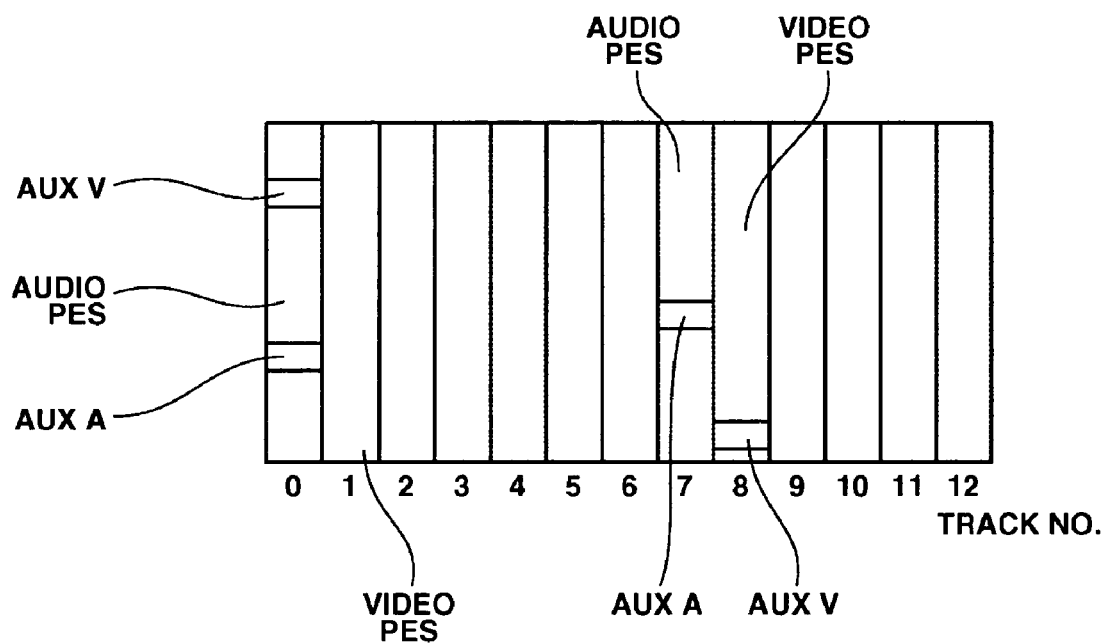
FIG. 3 is a diagram showing a state of recorded data on a tape.

FIG. 3 shows a state in which the pack unit in FIG. 2 is recorded on a tape.

In FIG. 3, the audio AUX data is recorded from the middle of the track number 0. Then, a plurality of audio data PES (Packetized Elementary Stream), video AUX data and video data PES are recorded, and thereafter the next pack unit is recorded from the middle of the track number 7.

The control unit 109 instructs the decoder 105 to decode picture data on the basis of the VBV-Delay data, every time a storage time of each picture lapses. The VBV-Delay data is included in the AUX data written into the AUX buffer 107. The decoder 105 reads the data of one picture from the memory 104 every time it receives an instruction from the control unit 109, decodes the data, and outputs the decoded image data to an output unit 106. The output unit 106 stores the decoded image data in its internal memory, rearranges order of frames to be outputted, and outputs the decoded image data.

Figure 4:
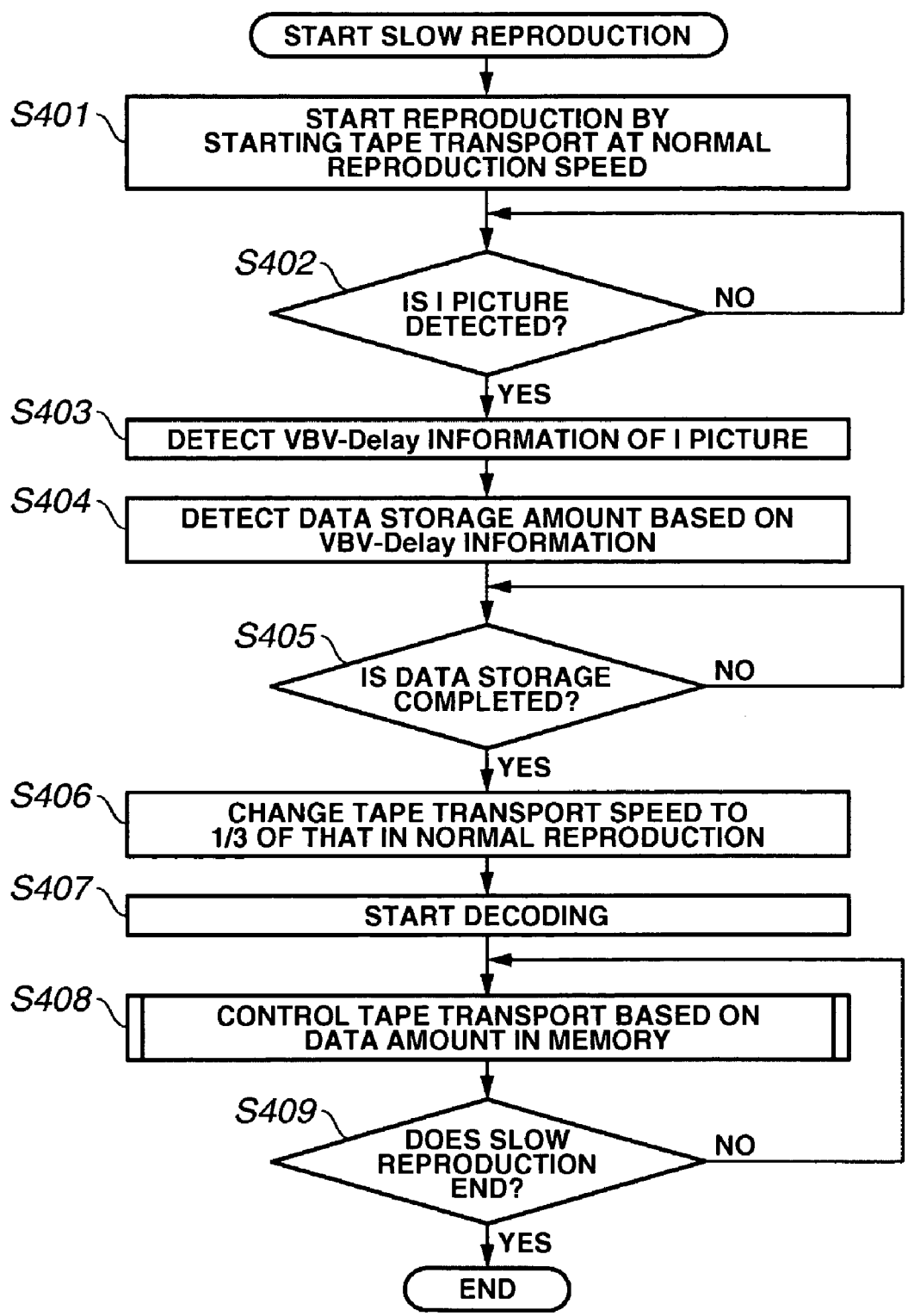
FIG. 4 is a flowchart showing a process of slow reproduction in the present embodiment.

A process in slow reproduction is described below. FIG. 4 is a flowchart showing a process of slow reproduction by the control unit 109.

When an instruction to perform slow reproduction is given (generated) from the operation unit 110, the control unit 109 instructs the transport unit 108 to transport the tape T at the same speed as in normal reproduction and the transport unit 108 transports the tape T at the same speed as in normal reproduction according to this instruction. As in normal reproduction, the reproduction unit 101 and the reproduction processing unit 102 reproduce data from the tape T, the demultiplexer 103 detects the MPEG data and the AUX data, and these detected data are respectively accumulated in the memory 104 and the AUX buffer 107 (S401).

The control unit 109 determines the picture type in the reproduced MPEG data on the basis of the video AUX data stored in the AUX buffer 107, and waits until the data of the I picture is reproduced (S402). When I picture is reproduced, the VBV-Delay time of I picture is detected from VBV-Delay data stored in the AUX buffer 107 (S403). The data storage amount of the VBV buffer required in decoding is calculated from the VBV-Delay time.

The data storage amount is obtained by multiplying the VBV-Delay time and system clock frequency (data reading rate from the memory 104).

The transport unit 108 continues transporting the tape T at a speed of normal reproduction until the calculated data storage amount is accumulated in the memory 104 (S405). When data storing is completed, the control unit 109 instructs the transport unit 108 to change the transporting speed of the tape to the speed corresponding to the multiplied speed of slow reproduction. In the present embodiment, the speed of slow reproduction is ⅓ times, so that the transport speed of the tape T is changed to ⅓ times the speed of normal reproduction (S406).

Then, decoding of the MPEG data accumulated in the memory 104 is started. At this time, the control unit 109 controls the decoder 105 so as to decode the MPEG data at the timing corresponding to the speed of slow reproduction (S407).

Figure 5:
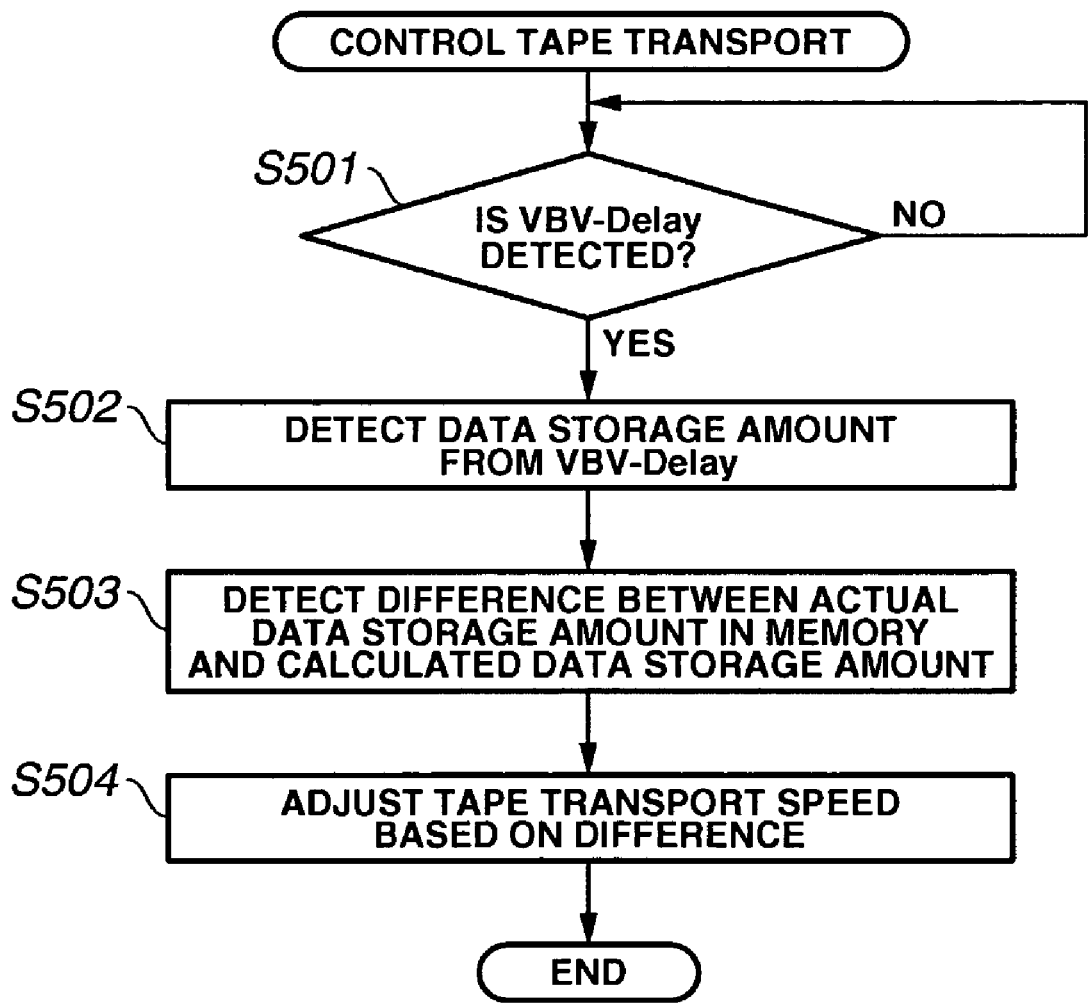
FIG. 5 is a flowchart showing a process of slow reproduction in the present embodiment.

After starting the decoding, the transport speed of the tape T is adjusted on the basis of the data amount accumulated in the memory 104 and the data storage amount calculated from the VBV-Delay information (S408). This process is described in reference to a flowchart of FIG. 5.

When decoding starts, the VBV-Delay information included in the AUX data is detected (S501), and data storage amount A of a buffer model specified by the VBV-Delay information is calculated (S502).

Further, actual data amount B currently accumulated in the memory 104 is detected by the difference between a write address and a read address of the data on the memory 104. Then, the difference between the calculated data storage amount A and the actual data storage amount B is detected (S503).

On the basis of this difference, the transport speed of the tape T advanced by the transport unit 108 is adjusted so that the difference takes a predetermined value (for example, it is 0 in this case) and the data storage amount of the memory 104 takes a target value (S504). Specifically, when the data storage amount A is more than the data storage amount B, the tape transport speed is decreased, and when the data storage amount B is more than the data storage amount A, the tape transport speed is increased.

When an instruction is given to end slow reproduction while the transport of the tape T is being adjusted in the way described above, the transport of the tape T is stopped, and slow reproduction is finished (S409).

As described above, according to the present embodiment, at the time of starting slow reproduction, a tape is transported at a speed of normal reproduction until the reproduction data stored in a memory reaches the data storage amount in a buffer model specified by VBV-Delay information. After the reproduction data reaches the data storage amount in a buffer model, the tape is transported at a speed corresponding to a multiplied speed of slow reproduction.

Therefore, a period from starting slow reproduction to obtaining the data necessary for decoding can be shortened, and a period from starting slow reproduction to outputting an image can be also shortened.

Further, the tape transporting speed is adjusted on the basis of the difference between data storage amount obtained from VBV-Delay information and actual data storage amount, while transporting the tape at the speed corresponding to a multiplied speed of slow reproduction. Therefore, underflow or overflow in a buffer memory can be prevented even in performing slow reproduction.

Slow reproduction is performed at ⅓ times the speed according to the above-described embodiment. However, the present invention can be similarly applied to the case where slow reproduction is performed at a different speed.

While the present invention has been described with reference to exemplary embodiments, it is to be understood that the invention is not limited to the disclosed embodiments. The scope of the following claims is to be accorded the broadest interpretation so as to encompass all modifications, equivalent structures and functions.

This application claims priority from Japanese Patent Application No. 2004-197613 filed Jul. 5, 2004, which is hereby incorporated by reference herein in its entirety.

What is claimed is:

1. A reproducing apparatus comprising:
   a reproduction unit configured to transport a tape-shaped recording medium and to reproduce an image data string including coded image data from the tape-shaped recording medium, wherein the coded image data is coded for every frame using intraframe coding and interframe predictive coding selectively;
   a memory storing the image data string reproduced by the reproduction unit;
   a decoding unit configured to read and decode the image data string stored in the memory;
   an instruction unit configured to generate an instruction to perform reproduction in one of a normal reproduction mode of reproducing the image data string at a normal reproduction speed and a slow reproduction mode of reproducing the image data string at a speed slower than the normal reproduction speed; and
   a control unit configured to, responsive to the instruction from the instruction unit to perform reproduction in the slow reproduction mode, control the reproduction unit to reproduce the image data string while transporting the tape-shaped recording medium at a transport speed of the normal reproduction mode until a predetermined amount of the image data string is accumulated in the memory, and thereafter, to reproduce the image data string while transporting the tape-shaped recording medium at a transport speed corresponding to the slow reproduction mode.

2. A reproducing apparatus according to claim 1, wherein the image data string includes storage amount information concerning a data amount of image data that is required to be accumulated in the memory during decoding of the image data string, and
   wherein the control unit determines a predetermined data amount of image data on the basis of the storage amount information reproduced by the reproduction unit.

3. A reproducing apparatus according to claim 2, wherein the control unit starts to accumulate the image data string in the memory beginning with image date of an intraframe-coded frame which is reproduced first after receiving the instruction to start the slow reproduction mode, and wherein the control unit determines the predetermined data amount of the image data on the basis of the storage amount information on the intraframe-coded frame which is reproduced first.

4. A reproducing apparatus according to claim 2, wherein the control unit, after starting transporting the tape-shaped recording medium at a speed corresponding to the slow reproduction mode, adjusts a transport speed of the tape-shaped recording medium on the basis of a difference between an information amount determined on the basis of the storage amount information reproduced by the reproduction unit and an information amount of image data actually accumulated in the memory.

5. A reproducing apparatus according to claim 2, wherein the control unit adds auxiliary information including the storage amount information to the image data string in correspondence to intraframe-coded image data.

6. A reproducing apparatus comprising:
   a reproduction unit configured to transport a tape-shaped recording medium and to reproduce an image data string including image data coded by an MPEG system from the tape-shaped recording medium;
   a detecting unit configured to detect the coded image data from the image data string reproduced by the reproduction unit to store the coded image data in an image memory, and detect auxiliary information including VBV-Delay information of the image data to store the auxiliary information in an auxiliary information memory;
   a decoding unit configured to read and decode the image data stored in, the image memory;
   an instruction unit configured to generate an instruction to perform reproduction in one of a normal reproduction mode of reproducing image data at a normal reproduction speed and a slow reproduction mode of reproducing image data at a speed slower than the normal reproduction speed; and
   a control unit configured to, responsive to the instruction from the instruction unit to start the slow reproduction mode, control the reproduction unit to reproduce the image data string while transporting the tape-shaped recording medium at a transport speed of the normal reproduction mode until a predetermined amount of the image data calculated from the VBV-Delay information stored in the auxiliary information memory is accumulated in the image memory, and thereafter, to reproduce the image data string while transporting the tape-shaped recording medium at a transport speed corresponding to the slow reproduction mode.

* * * * *